Aug. 15, 1944.  W. C. BUTTNER  2,356,117
HYDRO ELECTRODE CONTROL
Filed Nov. 1, 1940
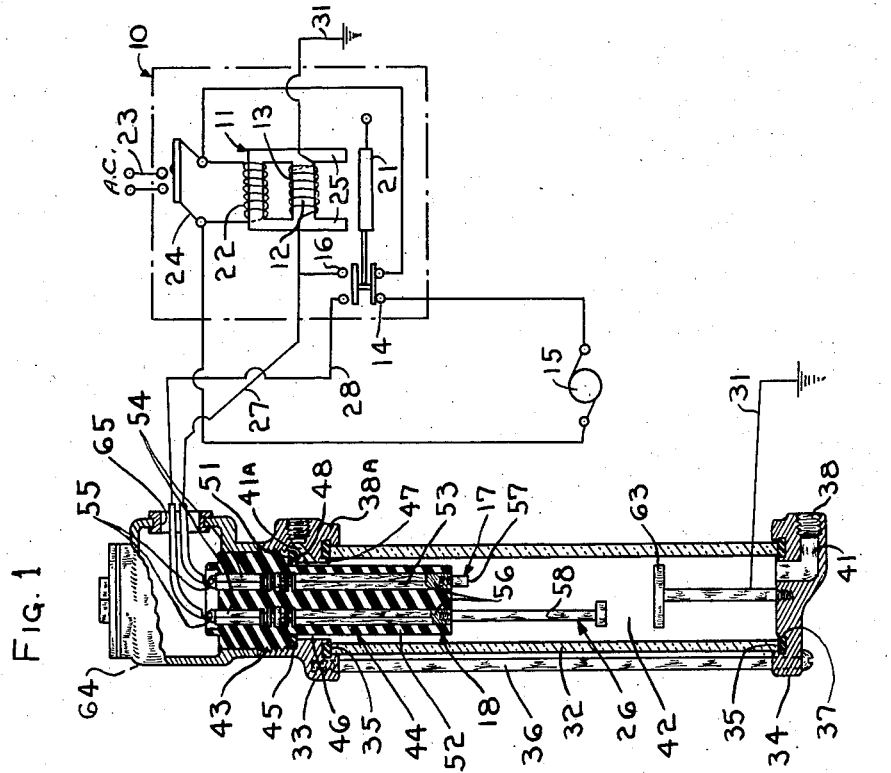
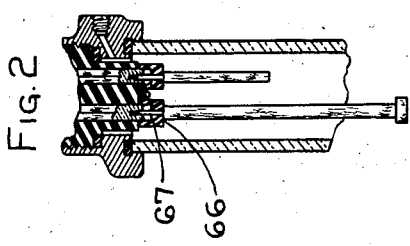
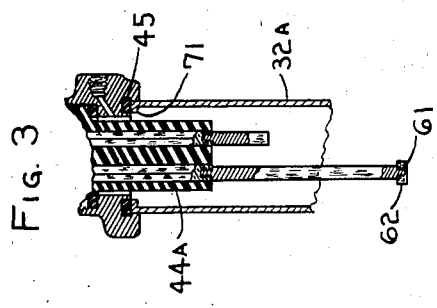
William C. Buttner
INVENTOR.
BY
HIS ATTORNEY Patented Aug. 15, 1944

2,356,117

UNITED STATES PATENT OFFICE 2,356,117

HYDROELECTRODE CONTROL

William C. Buttner, Winnetka, Ill., assignor to The Bastian Blessing Co., Chicago, Ill., a corporation of Illinois Application November 1, 1940, Serial No. 363,951

4 Claims. (Cl. 200—152)

The present invention relates to hydroelectrode control and to certain improvements over the fluid level control described in the co-pending application Serial 314,675 filed January 19, 1940 by Charles E. Arndt for a Carbonator now Patent No. 2,303,716 issued Dec. 1, 1942, reference to which is hereby made and incorporated as a part hereof.

The construction shown in the above mentioned co-pending application insofar as it relates to the present application, utilizes two electrodes that are disposed in a gauge glass compartment to control the operation of a pump. The pump is started when the liquid level breaks with one of the electrodes and the pump is stopped when the liquid level makes contact with the other electrode.

It has been noticed with liquid level controls of this type that in some installations, difficulty has been experienced with a short-cycling of the system. This difficulty occurred most often with carbonators where the carbonator was exposed to temperature variations, such as might occur in a cellar of a store. For instance, if the basement is warm and the carbonator stands for a substantial length of time between water refills, an equalization of temperatures around 70° F. takes place and the atmosphere in the gauge glass becomes saturated at that temperature. Then when the carbonator is refilled with a large body of water at water main temperatures around 40°–50° F., the cold water causes a temperature drop in the walls and parts of the container and results in an accumulation of condensation upon the walls of the gauge glass.

Furthermore, if the carbonator is located where the outside temperature varies, the rising and falling of the temperature will cause an accumulation of condensation upon the gauge glass also, annd any condensation upon the gauge glass as conventionally constructed creates a condition whereby a liquid short-circuit is made to the contacts to cause the short-cycling.

This short cycling was augmented by the surge of water caused by the agitator paddle starting rotation which tended to raise the level in the gauge higher than the quiescent level of liquid in the container. The liquid level in the gauge consequently reached even more quickly the margin of the condensed moisture adhering to the walls causing the short circuit and thereby closed the circuit with the cut-off contact long before enough water had been pumped to provide a reserve supply.

It is one of the objects of the present invention to provide an improved hydroelectrode control whose cycling will not be affected by condensation.

Another object of the invention is to provide an improved contact support for a hydroelectrode control upon the surface of which condensation is inhibited by any one of a number of factors.

A further object of the invention is to provide a construction for a device of the class described wherein the contact support is removed from thermo contact with outside parts and is made of a material having low conductivity of heat.

It is also a purpose of the invention to provide an electrode construction wherein a large contact and break area permits the transmission of current through a large enough column of liquid to prevent corrosion of the contact prior to the time that surface tension of the conducting liquid can no longer support its connection with the contact area of the electrode.

Another object of the invention is to provide a device of the class described which is small and compact, yet capable of being used as a standard unit, with tanks of different sizes or control different level differentials.

A further object is to provide a construction wherein condensation is augmented at one point where it will be harmless and thereby inhibited at another point where it would be dangerous.

These being among the objects of the present invention, other and further objects will become apparent from the drawing, the description relating thereto and the appended claims.

Referring now to the drawing:

Fig. 1 is a sectional and partial schematic view of a hydroelectric control illustrating a preferred embodiment of the invention.

Fig. 2 is a fragmentary sectional view illustrating another embodiment of the invention;

Fig. 3 is a view similar to Fig. 2 illustrating a third embodiment of the invention.

Before describing the hydroelectrode controls illustrated, it might be well for a better understanding of the invention to consider briefly the arrangement and characteristics of the circuits and electrical parts with which the control is connected.

A relay control 10 to which the hydroelectrode control is connected is shown diagrammatically in Fig. 1 and comprises a conventional double pole and double acting electromagnet 11 having a magnetic flux shunt 12 controlled by a choke coil 13. One switch 14 is a normally closed switch controlling the motor 15 and the other switch 16 is a normally open switch controlling the choke coil 13 in relation to the start electrode 17 of the hydroelectrode control 18.

The motor switch 14 and choke coil switch 16 are operated simultaneously by an armature 21. The coil 22 of the relay is in circuit continuously with alternating current service lines 23 whenever the service switch 24 is closed. The poles 25 of the electromagnet 11 are shunted as already mentioned, by a flux bar 12 which carries the choke coil 13. Thus whenever the choke coil 13 is short circuited or provided with a load it cancels the shunt characteristic of the shunt bar 12 and becomes a secondary coil in which a high voltage and low amperage current is induced.

Referring now to the hydroelectrode control 18, and the particular embodiments illustrated, the control comprises two electrodes, one of which 17, as already mentioned, is contacted by the liquid at its maximum level and the other one, 26, breaks with the liquid at its lowest level. In the particular embodiment shown, the liquid controlled is carbonated water and the pump operates to fill the container (not shown) in which the water is carbonated. The upper electrode 17 is connected directly to the choke coil 13 through the lead 27 and the lower electrode 26 is connected by lead 28 to the switch 16 which short circuits the electrodes when the armature 21 is in its flux induced position. The liquid is grounded to the other end of the choke coil through connections 31.

In operation, whenever the service switch 24 is closed and the container happens to be empty, the flux of the magnet 11 is shunted through the bar 12 and the motor switch 14 as closed by the armature in its resting position, starts the motor. After the motor and pump (not shown) have raised the level of the liquid to the point where it contacts the electrode 17, the choke coil is short circuited through the liquid and the connections 27 and 31. Flux is induced in the poles 25 and the armature is raised. This opens the motor switch 14 to stop the motor, and closes the choke coil switch 16 to short circuit the electrodes so that the choke coil will be loaded as long as liquid remains in contact with either of the electrodes.

As the carbonated liquid is withdrawn from the container the level in the gauge lowers until the liquid breaks with the lower electrode 26. The choke coil is thereby opened, the flux shunt 12 becomes effective again, and the armature resumes its resting position and closes the motor switch 14. The system then re-cycles itself.

Referring now to the hydroelectrode control 18, a cylindrical gauge glass 32 as shown in Fig. 1 and Fig. 2 or a cylindrical metal housing 32A is mounted between two end members 33 and 34 as sealed therewith by resilient washers 35. Clamping pressure establishing the seal is provided by bolts 36 which also serve as protecting parts for the glass 32.

The lower end member 34 is provided with a recess 37 to receive one of the washers 35 and is adapted to be connected to a container below the lower expected level of the liquid by an internally threaded boss 38 having an open passage 41 permitting free movement of liquid between the chamber 42 inside the glass 32 and the interior of the container.

The upper member 33 is connected to the container above the upper expected level in the container in a manner similar to the lower member, see the boss 38A, and passageway 41A.

The upper member is threaded as at 43 and receives an insulating plug 44 against a shoulder 45 below which a cylindrical bore 46 is provided as terminating in a flange 47 which provides a wall that prevents the pressure of the bolts 36 from squeezing the resilient washer 35 into contact with the plug 44. In this way the passageway 41A opening upon the face of the bore 46 is in open communication with the chamber 42 at all times.

The plug 44 has a shoulder 48 mating with the shoulder 45 and between them a gasket 51 is disposed to provide a sealed union.

Below the shoulder 48 of the plug, a cylindrical boss 52 extends downwardly into the chamber 42 a substantial distance beyond the bore 46 so that a wide expanse is provided to combat any condensation that might take place from ever becoming a part of any short circuit between the liquid and the electrodes.

The electrodes 17 and 26 are carried by the plug 44 and comprise inserts 53 which are threaded at opposite ends and embedded in the plug body. The upper ends 54 receive the terminal screws 55 which secure the wire leads 27 and 28 to the respective electrodes and the other ends 56 support interchangeable contacts 57 so that the switch can be used to regulate as to various levels and as to various differences of level depending upon the arrangement and lengths of the contacts.

The contact indicated by the number 58, namely the one breaking an electrical circuit, is threaded at its lower end as at 61 (Fig. 3) to receive a carbon button 62 whose lower face is of an area great enough to support a column of liquid capable of carrying the electrical current present to support the relay without chattering until the surface tension at the contact can no longer support the liquid column. The area provides for a sharp break and the carbon prevents the electrolytic corrosion of the metal in the electrode which otherwise takes place conventionally when the end of the electrode is metal and the break area is small.

Co-operating with the contact 58 is a conductor 63 for the ground terminal 31 which shortens the liquid gap between the electrode 58 and the ground connection when both are in contact with the liquid.

The upper end of the plug 44 and the connections 55 are protected by a cap 64 which has an opening 65 through the side thereof to receive the cable (not shown) in which the leads 27 and 28 are supported. The spacing of the connectors 55 is determined by legislative code and since the inserts 53 and contacts 57 are preferably made of stainless steel, this spacing is continued throughout the length of the plug 44 as a manufacturing economy, although it will be appreciated that offsets could be provided if desirable to reduce the diameter of the boss 52 and bring the contacts 57 and 58 closer together if certain installations require it. These factors determine the basic dimensions of the design and the secondary dimensions follow according to the teachings and purposes of the invention. For instance, in the particular embodiment shown in Fig. 1 the space between the boss 52 and the gauge glass 32 is wide enough to prevent a globule of condensed liquid bridging the gap.

In Fig. 2 a construction is shown wherein a counterpart of the large boss is made for each contact individually, wherein the contacts are shouldered as at 66 to receive rubber cups 67 which are compressed to seal the space around the threaded connection when the contacts are tightened in place. With this embodiment it is possible to control a level differential approaching the length of the gauge tube and thereby this embodiment provides the widest range of adjustability of the three embodiments shown.

The embodiment illustrated in Fig. 3 is provided for conditions where condensation is excessive, as where the container is disposed in a refrigerated compartment and the water injected into the container is comparatively warm. In this embodiment the gauge wall is made of metal 32A having high heat conductivity. The tube is flanged inwardly at the top as at 71 to provide a seal with the washer 45 and disposes the wall body itself as far from the plug body 44A as possible. Moreover with this construction the contact 63 can be dispensed with since the wall of the gauge serves as an electrical conductor.

The metal of the gauge wall 32A will induce upon its surface all the condensation expected to take place in the chamber and thereby indirectly prevent condensation upon the plug body 44A. In this connection it is to be noted that the plug is made not only of an insulating material, but also it is desirable to use an insulating material which has poor heat conductivity such as a material having a Bakelite base. In this way, while the gauge wall 32A will function as a condensing medium, the plug body will remain neutral and inactive regarding changes in temperature, being shielded from outside temperature by the wall of the gauge glass and by the nonconductivity of the material from which it is made.

Having thus described certain embodiments of the invention and having suggested certain modifications which can be made, it will be apparent to those skilled in the art that various other and further modifications may be made without departing from the spirit of the invention, the scope of which is commensurate with the appended claims.

What is claimed is:

1. A hydroelectrode control for carbonators comprising a gauge glass means defining a pressure compartment in which the level of carbonated water varies in relation to a controlled body of carbonated water and including a wall having high heat conductivity dividing two fluid bodies which have different temperatures, an electrode disposed in the compartment, a carbon button on the lower end of the electrode of greater diameter than the electrode, and means having low conductivity of heat supporting the electrode and extending into the compartment of the lower temperature and spaced from said wall a substantial distance.

2. In a device of the class described for carbonators, a plug body of insulating material, a metal insert embedded therein, means for connecting one end of the insert to a lead wire, an electrode threaded to the other end of the insert comprising a hydro contact having a reduced end portion providing a shoulder adjacent the end where it is secured to said insert, an insulating means mounted upon said reduced portion between the shoulder and the plug body to seal the connection between the contact and the insert under pressure exerted by tightening the electrode into place.

3. In a device of the class described having a gauge glass, a head mountable upon the gauge glass and a groove therein around the longitudinal bore divided therefrom by a wall, a resilient washer in said groove, a plug in said bore defining a space between the plug and bore, said head having an opening therethrough communicating with the bore bore, means for establishing compression upon said washer to seal the connection between the head and the gauge glass, said wall preventing the spread of said washer under compression into contact with said plug.

4. A hydroelectrode control for carbonators comprising a gauge glass means defining a pressure compartment having carbonated water therein whose level varies in relation to a controlled body of carbonated liquid and including a wall having high heat conductivity subjected to temperature and pressure upon one side differing from the temperature and pressure of the carbonated water in the compartment, an element having a low conductivity of heat extending into the compartment and spaced from said wall, said element having a shoulder, means for sealing the wall with respect to the shoulder including an intermediate member engaging the shoulder and the wall to maintain said spaced relation, an electrode carried by said element in pressure sealed relation disposed in said compartment and a carbon button on the lower end of the electrode of greater diameter than the electrode and providing a surface capable of supporting a quantity of carbonated water on the lower end thereof to establish a circuit breaking point spaced from the carbon button.

WILLIAM C. BUTTNER.